United States Patent [19]

Reincke

[11] Patent Number: 5,667,019
[45] Date of Patent: Sep. 16, 1997

[54] SOIL TREATING DEVICE

[75] Inventor: Marinus Reincke, Leersum, Netherlands

[73] Assignee: Redexim Handel- en Exploitatiemaatschappij B.V., Netherlands

[21] Appl. No.: 513,291

[22] Filed: Aug. 10, 1995

[30] Foreign Application Priority Data

Aug. 12, 1994 [NL] Netherlands ............................ 9401311

[51] Int. Cl.⁶ .................................................. A01B 45/02
[52] U.S. Cl. ........................... 172/49.5; 172/59; 172/111; 15/28; 15/50.1; 15/87
[58] Field of Search ........................ 172/29, 30, 49, 172/49.5, 57, 59, 110, 111, 522, 533, 524, 532; 37/232; 15/21.1, 28, 49.1, 50.1, 78, 87; 56/366, 377

[56] References Cited

U.S. PATENT DOCUMENTS

| | | | |
|---|---|---|---|
| 1,691,351 | 11/1928 | Hicks | 172/111 |
| 2,050,120 | 8/1936 | Pizarro | |
| 2,193,157 | 9/1940 | Ayo | |
| 2,531,557 | 11/1950 | Dayton | 172/111 |
| 2,805,612 | 9/1957 | Beard | 172/111 |
| 3,135,985 | 6/1964 | Hulst | 15/49.1 |
| 3,781,937 | 1/1974 | Jacobs | 15/49.1 |
| 5,054,559 | 10/1991 | Paul | 172/59 |
| 5,228,521 | 7/1993 | Sing | 172/59 |
| 5,477,927 | 12/1995 | Figura | 172/29 |

FOREIGN PATENT DOCUMENTS

| | | |
|---|---|---|
| 0081600 | 6/1983 | European Pat. Off. |
| 1047289 | 12/1953 | France |
| 317606 | 12/1919 | Germany |

Primary Examiner—Terry Lee Melius
Assistant Examiner—Christopher J. Novosad
Attorney, Agent, or Firm—Webb Ziesenheim Bruening Logsdon Orkin & Hanson, P.C.

[57] ABSTRACT

The invention relates to a soil treating device comprising at least one working element rotatably driven by a rotation shaft and a frame accommodating the working element and displaceable practically parallel to the ground, characterized in that the rotatable working element consists of a plurality of contact elements intended for ground working and fixed in a holder, wherein at least a part of the contact elements lies at different distances from the rotation shaft.

14 Claims, 2 Drawing Sheets

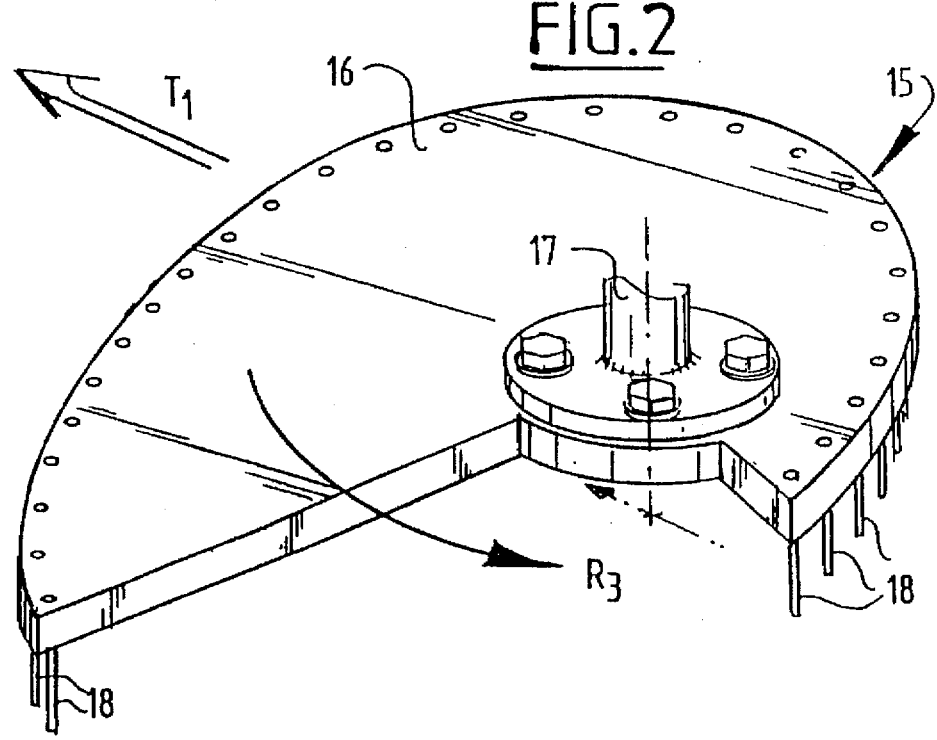
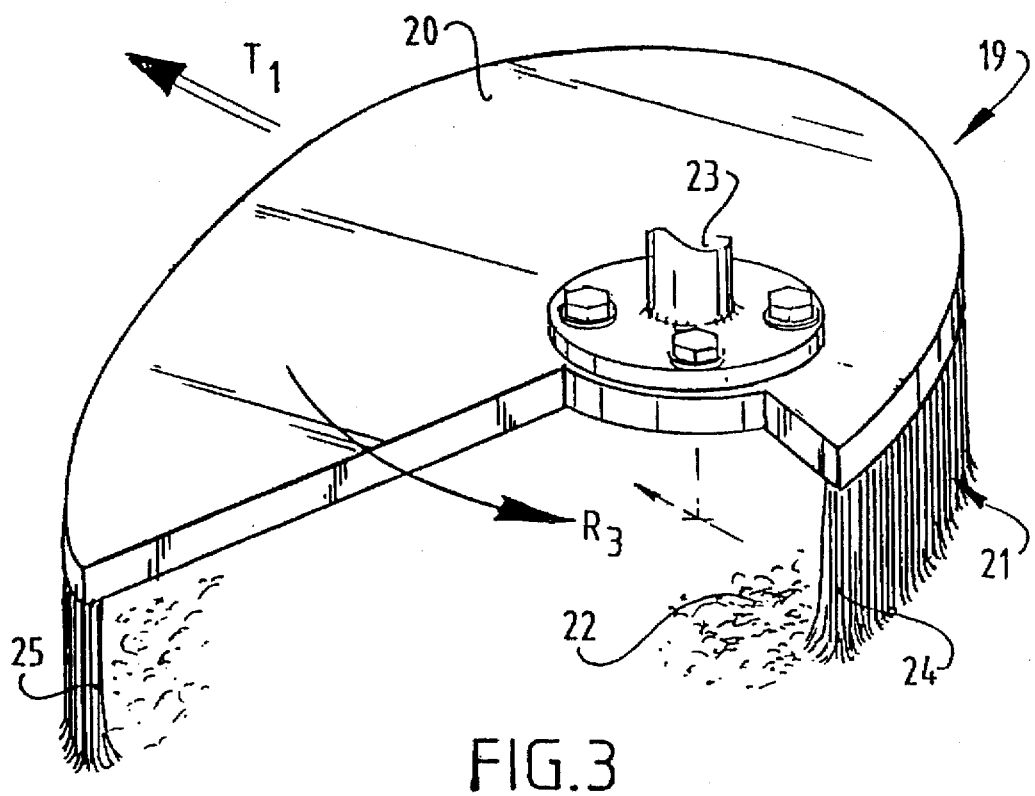

SOIL TREATING DEVICE

BACKGROUND OF THE INVENTION

1. Field of the Invention

The invention relates to a soil treating device comprising at least one working element rotatably driven by a rotation shaft and a frame accommodating the working element and displaceable practically parallel to the ground.

2. Description of the Prior Art

Such soil treating devices are known. There exists for instance a rotor head harrow provided with rotors to which pins or blades are fixed for clod-breaking and levelling the ground. A rotor head harrow is generally provided with a plurality of rotors wherein the working zones of mutually adjacent rotors are mutually overlapping. The overlapping zone of two rotors is worked much more intensively than the zones worked only by a single rotor. It is hereby impossible to work the ground equally intensively over the whole surface. This can result for instance in partial "compacting" of the ground in the overlapping zones.

The invention has for its object to provide a soil treating device with which the ground can be worked very uniformly.

SUMMARY OF THE INVENTION

The invention provides for this purpose a soil treating device of the type stated in the preamble, in which the rotatable working element consists of a plurality of contact means intended for ground working and fixed in a holder, wherein at least a part of the contact means lies at different distances from the rotation shaft. The differences in distance between the rotation shaft and the contact means fixed to a working element enables a much more uniform working of the ground.

The soil treating device is preferably characterized in that the distance of the at least a part of the contact means to the rotation shaft gradually increases from a minimum distance to a maximum distance in progression through an angle of a maximum of 360° and thereafter the at least a part of the contact means terminates. Due to such a positioning of the at least a part of the contact means loose material lying on the ground can be carried along over the ground by the working elements.

Another preferred embodiment is characterized in that only a peripheral part of the holder is provided with contact means. The holder hereby acquires a minimal size.

Other preferred embodiments are characterized in that about three-quarters of the periphery of the holder is provided with contact means and in that the contact means are brush bristles, aerating pins or clod-breaking pins. These embodiments increase the application possibilities, for instance for brushing filling material lying on the ground into openings (such as grooves or holes), aerating or harrowing.

The apparatus preferably comprises a number of working elements wherein the rotation direction of a working element is opposed to the rotation direction of an adjacent working element. The distance between the rotation shafts of two such mutually adjacent working elements is preferably smaller than twice the maximum distance between the contact means and the associated shaft. In this manner it is possible to cause the zones worked by two working elements to mutually overlap without an extra-intensive working of the ground taking place in the overlapped zone.

BRIEF DESCRIPTION OF THE DRAWINGS

The invention will be further elucidated with reference to the non-limitative embodiments shown in the following figures. Herein:

FIG. 2 shows a perspective view of a working element as used in the apparatus of FIG. 1, wherein the contact means are formed by aerating pins; and FIG. 3 shows a perspective view of a working element corresponding with that of FIG. 2, wherein the contact means are formed by brush bristles.

DESCRIPTION OF THE PREFERRED EMBODIMENTS

Figure 1:
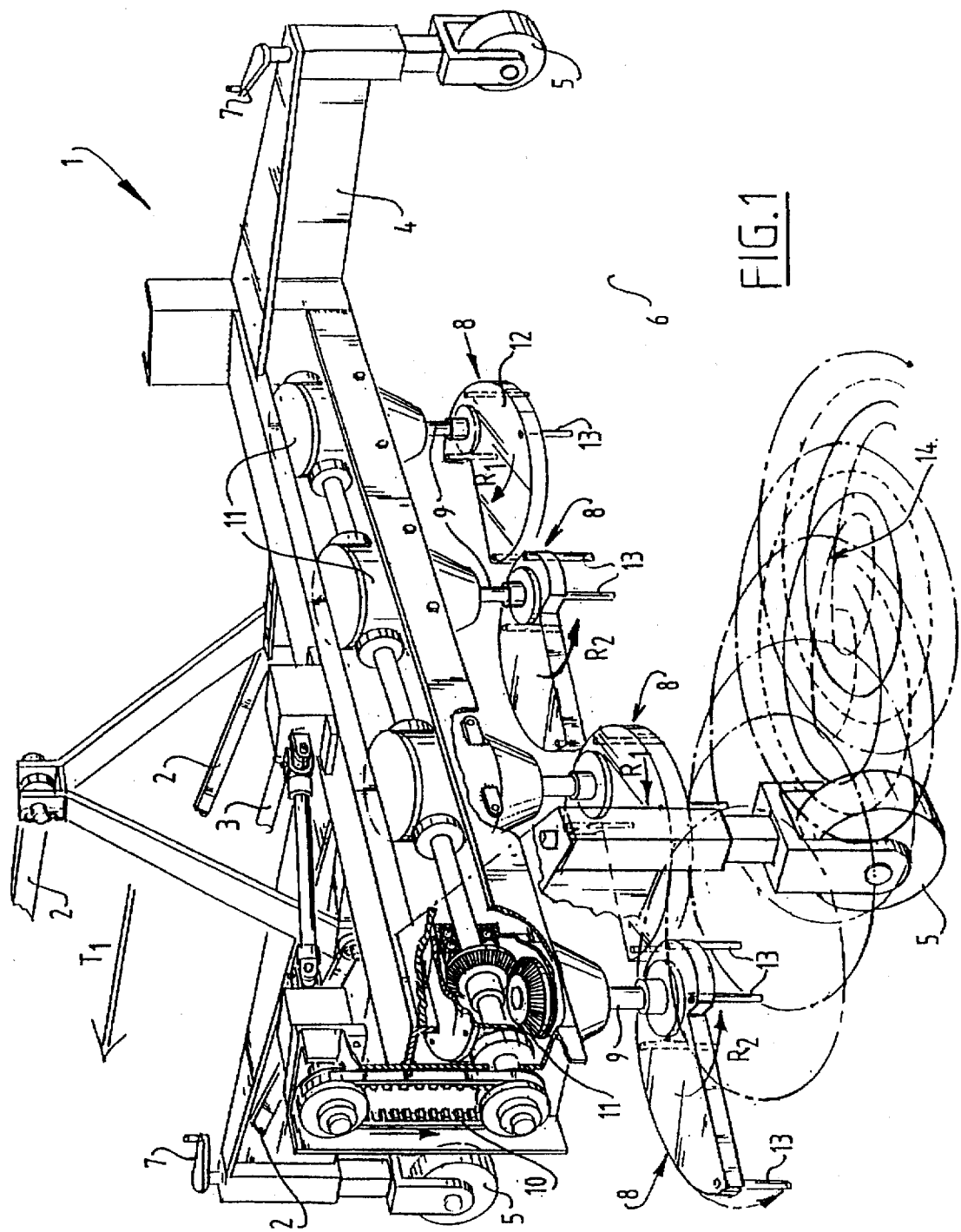
FIG. 1 shows a partly cut away perspective view of a soil treating device according to the invention.

A soil treating device 1 is provided with arms 2 for fixing to a tractor (not shown). The apparatus 1 can of course also be embodied as a self-propelled device. The apparatus 1 as shown in FIG. 1 is driven by a power take-off 3 but other alternatives, such as a hydraulic motor, are of course also conceivable here. The apparatus 1 comprises a frame 4 which is moved over the ground by means of wheels 5. The distance of the frame 4 from the ground 6 is adjustable by means of adjusting means 7. The apparatus 1 shown here comprises four working elements 8 which are driven by means of rotation shafts 9 in mutually opposing directions (arrows R1, R2). The drive power provided by power take-off 3 is supplied via a transmission 10 to gearboxes 11. The drive power is transmitted by the gearboxes 11 to rotation shafts 9.

The working elements 8 are formed by a holding plate 12 into which are received clod-breaking pins 13 located at different distances from the rotation shaft 9. The position of clod-breaking pins 13 relative to the ground 6 is adjustable by the adjusting means 7. Clearly shown in FIG. 1 is that the clod-breaking pins 13 are fixed to the periphery of holding plate 12. The thereby resulting minimal outer dimensions of holding plate 12 enable the rotation shafts 9 to be placed relatively closely to each other. The distance between two mutually adjacent rotation shafts 9 in this particular figure is clearly smaller than twice the maximum distance between a clod-breaking pin 13 and the associated rotation shaft 9. The position of clod-breaking pins 13 relative to the associated rotation shaft 9 define a working pattern 14. It thus becomes possible to work the ground uniformly despite the presence of ground zones which are worked by only one working element 8 and zones worked by two different working elements 8.

FIG. 2 shows an alternative working element 15 wherein a holder 16 is fixed to a rotation shaft 17 and aerating pins 18 are received in holder 16. In addition to the clod-breaking action already described in FIG. 1, it is thereby also possible to aerate for instance a lawn with such a working element 15.

FIG. 3 shows yet another working element 19, wherein a part of the peripheral edge of a holder 20 is provided with brush bristles 21. With such a working element 19 it is for instance possible to brush sand 22 into the grooves between newly laid paving stones or clinkers. It is also possible for instance to fill with sand the holes resulting in a lawn during aerating by making use of the working element 19. Because the opening between the part 24 of the brush bristles 21 located closest to a rotation shaft 23 and the part 25 of the brush bristles 21 located furthest from the rotation shaft 23 is moved forward through the rotation direction R3, fresh sand 22 will continually be carried under the holder 20. The sand 22 left undisturbed by the part 24 of the brush bristles 21 located closest to rotation shaft 23 is carried along again by the part 25 of the brush bristles 21 located furthest from rotation shaft 23 despite the direction of travel T1 of apparatus 1. In this way little sand 22 (or other optional material for insertion) will be lost.

I claim:

1. A soil treating device comprising at least one working element rotatably driven by a rotation shaft and a frame accommodating the working element and displaceable substantially parallel to the ground, the rotatable working element comprises a plurality of contact means intended for ground working and fixed in a holder, wherein at least a part of the contact means lies at different distances from the rotation shaft, and wherein the distance between the at least a part of the contact means and the rotation shaft gradually increases from a minimum distance to a maximum distance in progression through an angle of a maximum of 360° and thereafter the at least a part of the contact means terminates.

2. The soil treating device as claimed in claim 1, wherein the device further comprises a plurality of working elements wherein a rotation direction of a working element is opposed to the rotation direction of an adjacent working element.

3. The soil treating device as claimed in claim 2, wherein a distance between the rotation shafts of two adjacent working elements is less than twice the maximum distance between the contact means and the rotation shaft associated with the contact means.

4. The soil treating device as claimed in claim 1, wherein about three-quarters of a periphery of the holder is provided with contact means.

5. The soil treating device as claimed in claim 4, wherein the contact means are brush bristles.

6. The soil treating device as claimed in claim 5, wherein the device further comprises a plurality of working elements wherein a rotation direction of a working element is opposed to the rotation direction of an adjacent working element.

7. The soil treating device as claimed in claim 6, wherein a distance between the rotation shafts of two adjacent working elements is less than twice the maximum distance between the contact means and the rotation shaft associated with the contact means.

8. The soil treating device as claimed in claim 1, wherein the contact means are brush bristles.

9. The soil treating device as claimed in claim 1, wherein the contact means are pins.

10. The soil treating device as claimed in claim 1, wherein the contact means are clod-breaking pins.

11. The soil treating device as claimed in claim 1, wherein only a peripheral part of the holder is provided with contact means.

12. The soil treating device as claimed in claim 11, wherein the contact means are clod-breaking pins.

13. The soil treating device as claimed in claim 12, wherein the device further comprises a plurality of working elements wherein a rotation direction of a working element is opposed to the rotation direction of an adjacent working element.

14. The soil treating device as claimed in claim 13, wherein a distance between the rotation shafts of two adjacent working elements is less than twice the maximum distance between the contact means and the rotation shaft associated with the contact means.

* * * * *